United States Patent [19]

Melocik

[11] Patent Number: 4,472,663
[45] Date of Patent: Sep. 18, 1984

[54] FAILURE PROTECTION CIRCUIT FOR A TWO-MOTOR LIFT TRUCK

[75] Inventor: Grant C. Melocik, Chardon, Ohio

[73] Assignee: Towmotor Corporation, Mentor, Ohio

[21] Appl. No.: 261,103

[22] Filed: Aug. 18, 1980

[51] Int. Cl.³ ............................................. H03K 3/00
[52] U.S. Cl. .................................... 318/82; 318/139; 318/447
[58] Field of Search ................. 318/87, 82, 373, 139, 318/447

[56] References Cited

U.S. PATENT DOCUMENTS

| | | | |
|---|---|---|---|
| 3,936,709 | 2/1976 | Wright | 318/373 X |
| 3,950,681 | 4/1976 | Kern | 318/139 |
| 3,965,402 | 6/1976 | Mogle | 318/55 |
| 4,028,597 | 6/1977 | Delaney et al. | 318/87 |
| 4,054,817 | 10/1977 | Gurwicz et al. | 318/82 |
| 4,081,725 | 3/1978 | Schmidt et al. | 318/447 |
| 4,296,361 | 10/1981 | Archer | 318/54 |

Primary Examiner—B. Dobeck
Attorney, Agent, or Firm—Krass & Young

[57] ABSTRACT

An electrically operated dual motor drive system having first and second reversible traction motors (14, 16) driven by a power source (18). Motor control circuitry (10, 12) for controlling the direction of current flow through the motors (14, 16) is designed to be actuated by only two coils (36, 42). Preferably, control circuits (10, 12) employ an arrangement of normally open (32a, 32b, 38a, 38b) and normally closed (34a, 34b, 40a, 40b) contacts such that the two motors (14, 16) operate in reverse directions in the event of a complete system malfunction. A line contactor (20) is advantageously utilized to simultaneously serve as a main power disconnect for a variety of motors within the system.

12 Claims, 2 Drawing Figures

FAILURE PROTECTION CIRCUIT FOR A TWO-MOTOR LIFT TRUCK

DESCRIPTION

1. Technical Field

This invention relates to electrically operated dual motor drive systems for industrial vehicles and the like and more particularly, to electronic circuitry for direction control.

2. Background Art

Multiple-motor electric vehicles such as industrial lift trucks are known in the art. At least one such vehicle employs reversible traction motors individually coupled to the left and right drive wheels. Each motor includes control circuitry for selecting the direction of motor operation.

In the prior art, such control circuitry includes two sets of contacts for each motor, one set causing current to flow from a power supply through the motor in one direction and the other set causing current to flow through the motor in the opposite direction. A two-motor vehicle requires a total of eight contacts and four coils.

To move in a given direction, the operator selects the appropriate position on a direction selector device. The associated contacts are energized to direct current through each of the motors in the same direction thereby creating vehicle movement in the selected direction.

When the user places the direction selector in the reverse direction, the remaining coil of each motor is selected and the previously energized coils are de-energized. Under these conditions, the motor control circuit contacts which are selected cause the current to flow through the motors in the reverse direction and thereby imparting vehicle motion in the opposite direction. Placing the direction selector in a neutral position de-energizes all four of the coils. This, in turn, returns all of the motor control contacts to their normally open conditions such that no current is capable of flowing through the motors.

While the above-described arrangement is satisfactory, a number of advantages could be realized if it were possible to safely reduce the number of solenoid coils. One advantage is the elimination of certain packaging constraints, thus reducing vehicle size and weight. Another is the reduction in the portion of current from the battery system which goes into non-propulsion activities. Still another is the elimination of control functions and electrical transient sources. The present invention is directed to overcoming one or more of the problems as set forth above.

DISCLOSURE OF THE INVENTION

The present invention overcomes the disadvantages of the prior art techniques through the provision of uniquely designed motor control circuitry which is selectively activated by only two coils instead of the previously used four, thereby resulting in substantial cost and space savings. In general, this is accomplished in an apparatus for controlling the direction of rotation of two DC traction motors as may be found, for example, in an electrically powered vehicle, said apparatus including first circuit means for establishing complemental or oppositely directed current paths from a DC source through one of the traction motors, second circuit means for establishing similar complemental current paths from the DC source to the second traction motor, each of the first and second circuit means being of the control-signal-responsive type and being further arranged so as to normally close one of the two complemental circuits in the uncontrolled or signal-free condition. Whenever the normally closed circuit is the selected circuit, no control signal need be sent to at least one of the first or second circuit means; only when a change of condition is desired must a control signal be generated and sent. In an illustrative embodiment, a first motor control circuit for one of the motors includes a first set of normally open contacts for directing current through the first motor in one direction when actuated. A second set of contacts for the first motor control circuit is normally closed and serves to direct current through the first motor in a second direction. A second motor control circuit for the other motor similarly includes a set of normally closed contacts and a set of normally open contacts. Only two coils are utilized, each coil actuating both sets of contacts in its associated motor control circuit. Logic control circuitry is employed for selectively energizing either the first or second coil.

BEST MODE FOR CARRYING OUT THE INVENTION

Figure 1:
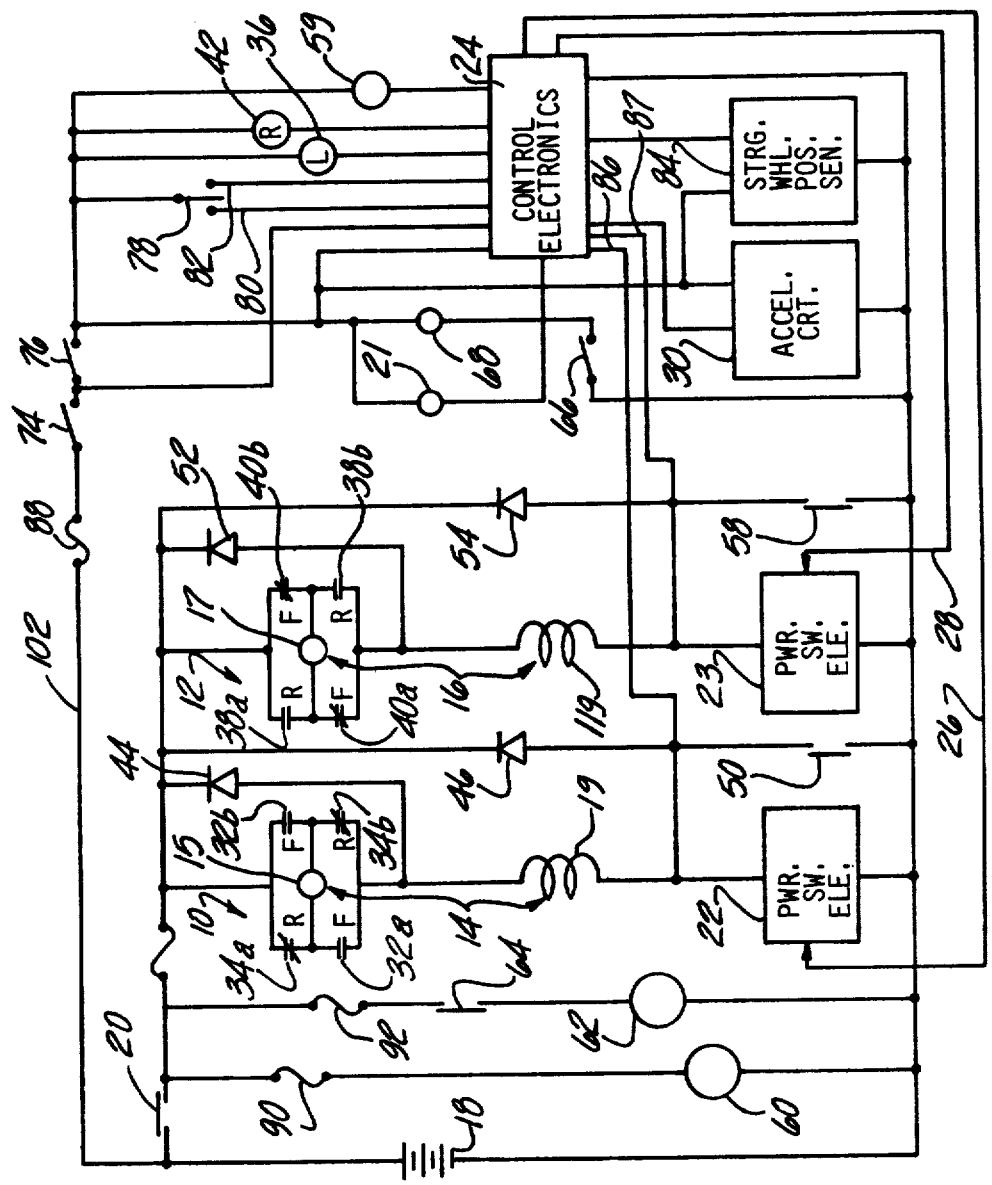
FIG. 1 is a schematic circuit diagram of a dual motor drive circuit of the preferred embodiment of the invention.

Referring to FIG. 1, the preferred embodiment of the invention is shown in connection with an electrically operated dual motor system including left and right traction motor control circuits 10 and 12, respectively. Left motor control circuit 10 includes a reversible electric traction motor 14, with the right circuit 12 similarly including a reversible electric traction motor 16. Motors 14, 16 include armatures 15, 17 and field windings 19, 119, respectively, as known in the art. Both traction motor circuits 10 and 12 receive DC current from a DC power source such as a large heavy duty battery 18. A line contactor 20 couples the electrical power to motor control circuits 10 and 12 when energized by its associated coil 21. The mean current value through traction motor circuit 10 is controlled by a power switching element 22. Similarly, traction motor 16 is connected in series with a power switching element 23 which is substantially identical to element 22. As is known in the art, power switching elements 22 and 23 are pulse and/or frequency modulated to vary the mean voltage applied to their respective motor control circuits 10 and 12 according to the desired motor speeds. The modulation of power switching elements 22 and 23 is controlled by a central controller 24 which receives various status information from the system as input signals and provides selected output signals depending upon the status of the input signals. Preferably, controller 24 is a microprocessor such as a number 3870 component manufactured by Mostek Corporation. Controller 24 supplies output signals on lines 26 and 28 to control the modulation of switching elements 22 and 23, respectively. Generally, the modulation control signals are determined by the state of an accelerator position sensor circuit 30 which detects the position of a speed select device.

Power switching elements 22 and 23 may be independently or differentially varied according to the various operating parameters of the vehicle in which traction motors 14 and 16 are mounted.

Special attention is now drawn to the direction control contacts of the motor control circuits 10 and 12. Left circuit 10 includes a first set of normally open contacts 32a and 32b. When actuated or closed, contacts 32a and 32b direct current through armature 15 in a first direction which is from right to left with reference to FIG. 1. A second set of contacts 34a and 34b are also provided. Unlike contacts 32a and 32b, contacts 34a and 34b are normally closed such that they direct current in an opposite direction through armature 15 in their steady state or de-actuated mode. In such state, contacts 34a and 34b direct current from battery 18 from left to right through armature 15. Both sets of contacts 32a, 32b, and 34a, 34b are actuated by a single coil 36. When energized, coil 36 serves to close normally open contacts 32a and 32b and simultaneously open the normally closed contacts 34a and 34b. The energization of coil 36 is controlled by appropriate signals from controller 24.

Focusing attention on the right traction motor control circuit 12, it also includes two sets of contacts. Normally open contacts 38a and 38b direct current flow through armature 17 in the direction characterized by a left to right current flow when actuated or closed. It should be noted that the closure of normally open contacts 38a and 38b causes current flow through the right traction motor armature 17 in an opposite direction from the current flow through left traction motor armature 15 when normally open contacts 32a and 32b are actuated. Normally closed contacts 40a and 40b when de-actuated cause current flow in a right to left direction through right traction motor armature 17. Again, it should be noted that this direction is opposite from the current flow through left traction motor armature 15 when the normally closed contacts 34a and 34b are in a closed position. Both sets of contacts 38a, 38b, and 40a, 40b are actuated by a single coil 42. Coil 42 is energized by an appropriate signal from controller 24. When energized, coil 42 serves to close the normally open contacts 38a, 38b and to open the normally closed contacts 40a, 40b.

Left motor control circuit 10 further includes a plugging diode 44 and a flyback diode 46 to provide a re-circulating path for current which is generated by motor 14 when coating; i.e. when driven by the load or its own inertia. Circuit 10 is completed by the provision of a bypass contactor 50 which operates, when actuated, to provide an alternate current path for motor 14 during high load or maximum speed conditions thereby bypassing power switching element 22. Similarly, right motor control circuit 12 also includes a plugging diode 52, flyback diode 54, and a bypass contactor 58, all of which operate in a similar manner to their counterparts in the left motor control circuit 10. Both bypass contactors 50 and 58 are controlled by coil 59 coupled to controller 24.

The system of the present invention further includes a power steering motor 60 which is also powered by battery 18 when line contactor 20 is actuated. The energization of a lift motor 62 is controlled by the position of a lift contactor 64. Lift contactor 64 is actuated upon closure of a lift switch 66 which energizes lift contactor coil 68.

Controller 24 includes a plurality of inputs which receive various status condition signals within the system as detected by a variety of sensing devices. In addition to the accelerator circuit 30 noted above, switch 74 provides a control signal indicative of the position of a key switch in the vehicle and switch 76 detects the mounting of the operator onto a seat for driving the vehicle. A three positioned direction selector switch 78 selectively provides control input signals on line 80 when in a forward position, on line 82 when in a reverse position, with neither signal lines being selected when in a neutral position. Other input signals to controller 24 are derived from a wheel position sensor 84 which provides control signals indicative of the position of a rotating steering wheel as will be more fully described under the heading "Industrial Applicability". Signal lines 86, 87 serve to provide an indication of the condition of power switching elements 22, 23 and bypass contactors 50, 58 during system operation as will also be more fully described under the following heading. Fuses 88, 90, and 92 complete the system circuitry to provide overload protection at various points within the system.

Industrial Applicability

Figure 2:
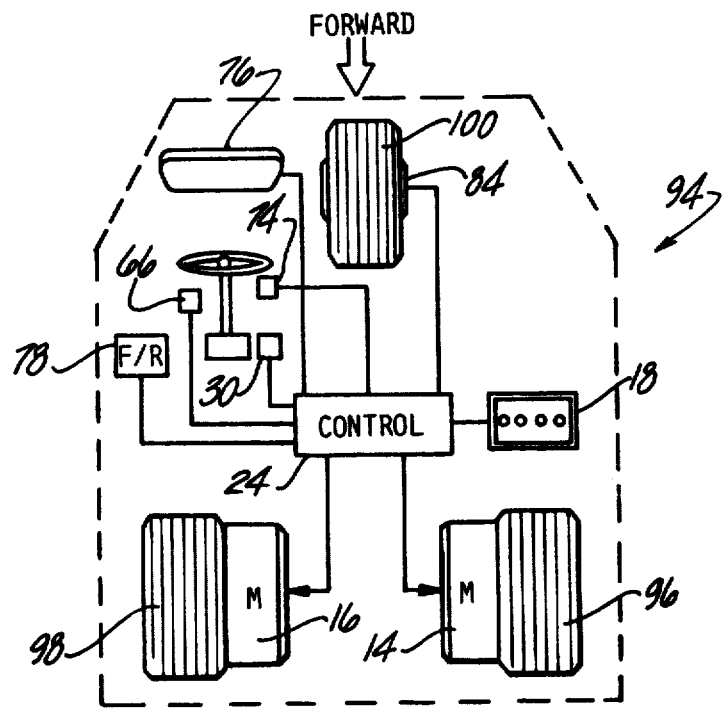
FIG. 2 is a block diagram of an industrial vehicle in which the system of FIG. 1 finds particular utility.

Referring now to FIG. 2, the operation of the system of FIG. 1 will now be described with reference to the application of said system to an electrically powered three wheel industrial vehicle 94 such as a fork-lift truck. In such an application the armature 15 of left traction motor 14 is mechanically connected in driving relationship with the left front wheel 96 and the armature 17 of right traction motor 16 is similarly associated with the right wheel 98 of the vehicle. Wheel position sensor 84 detects the angular position of the rear dirigible wheel 100 of the vehicle. The output of sensor 84 may be utilized to differentially vary the switching rates of power switching elements 22 and 23 at extreme angles of wheel 100. Key switch 74 is located near the operator station. Seat switch 76 is arranged in a known manner to close when an operator assumes a driving position on the seat. Accelerator circuit 30 detects the position of the accelerator and provides output signals indicative of its displacement. Lift switch 66 provides the operator with a means for selectively activating a lift mechanism (not shown) which is generally associated with such vehicles. A manually operable direction selector 78 controls the selection of forward or reverse movement of the vehicle 94.

In normal operation, the operator first turns on key switch 74. With reference to FIG. 1, this supplies power over line 102 from battery 18 to controller 24. Controller 24 then determines the status of seat switch 76. If the operator has mounted the seat thereby closing switch 76 the controller 26 will provide an output signal to energize line contactor coil 21. This actuates line contactor 20 to couple battery 18 power to the motor control circuits 10 and 12. Immediately upon closure of line contactor 20, controller 24 checks the status of input lines 86 and 87. Lines 86, 87 will be substantially at the positive battery voltage if power switching elements 22 and 23 and bypass contactors 50, 58 are properly operating at this stage of the operation. If power switching elements 22, 23 are short circuited or if bypass contactors 50, 58 are closed, then signal lines 86 and/or 87 will be substantially at the negative battery voltage or ground level. If such a condition exists, controller 24 will remove power from the line contactor coil 21 thereby de-energizing line contactor 20 and removing power from the system. If the start-up check succeeds, the operator will place direction selector 78 in either the forward or reverse position. The coupling of the wiper of the direction selector 78 to one of lines 80 or 82 will cause controller 24 to selectively energize coil 36 or 42. Assume that the user selects the forward position in which line 80 is contacted. Controller 34 responds by energizing coil 36 which, in turn, closes normally open contacts 32a and 32b and simultaneously opens normally closed contacts 34a, 34b of the left motor control circuit 10. Note that the contacts in the right motor control circuit 12 are not affected. With the contacts in this state, the current flow through both motors 14 and 16 is in a uniform direction causing them to rotate in the forward direction. The current path through left motor 14 is established by contacts 32a and 32b, with the current flowing from right to left through armature 15. The current path through right motor armature 17 is from right to left through contacts 40a and 40b. Controller 24 responds to control signals from accelerator circuit 30 by modulating the switching elements 22 and 23 in a manner known in the art to control vehicle speed.

If the user desires the vehicle 94 to move in a reverse direction, selector 78 is moved such that the wiper contacts line 84. In response thereto, controller 24 energizes coil 42 instead of coil 36. Under these conditions the left motor control circuitry 10 contacts remain in their steady state condition but the contacts of the right motor circuitry 12 are actuated. Such actuation causes normally open contacts 38a, 38b to close and the normally closed contacts 40a and 40b to open. Hence, current flow through the motors 14 and 16 is directed therethrough in the same left to right direction causing uniform motor rotation in the reverse direction. Note again that the energization of coil 42 does not effect the contacts in the left motor control circuit 10.

Thus, it can be seen that the present invention provides uniquely designed motor control circuitry which requires only two directional coils in comparison with the four coils previously used in the industry. In the prior art four coil scheme, the control logic would of necessity energize two coils at a time thereby causing an appreciable amount of current flow drain in the circuit. In addition to the savings of costs and space, the present invention minimizes these troublesome circuit conditions since only one coil is energized at a time.

When the selector 78 is in the neutral position in which neither line 80 or 82 is contacted by the wiper, controller 24 does not energize either of coils 36 or 42. Consequently, the contacts of the left and right motor control circuits 10 and 12 assume their steady state condition.

If the system is functioning normally, controller 24 will de-energize coils 21 and 59 to open line contactor 20 and bypass contactors 50, 58, respectively, to remove power to the motor control circuitry in the event of a detected system malfunction, such as a short circuit condition in the power switching elements 22, 23. However, in the event of total failure of the controller 24 in which neither of the coils 36 or 42 are energized, the steady state condition of the motor control circuit contacts will condition the current flow through their respective motors such that they operate in opposite directions or counter-rotate. By referring to the state of the contacts shown in FIG. 1, it can be seen that current will flow through the left motor 14 in a left to right direction whereas current flow through motor 16 will be in a right to left direction. Accordingly, a run away condition of the vehicle is prevented. Instead of rotating in unison, the motors now operate in opposite directions to substantially counteract each other. Depending upon the position of the steering wheel 100, vehicle 94 will either remain stationary or will move in a generally circular path.

In view of the foregoing it can now be realized that the present invention not only provides economies of cost and space, but it also provides distinctive fail-safe measures in the event of complete system malfunction. It is also important to note that the same line contactor 20 which is used to apply power to the power steering motor 60 is used as the main system power disconnector. This line contactor in the four coil prior art approach was used merely to supply power to the power steering motor. In the present invention, however, it provides a dual function without an increase in manufacturing costs and facilitates the implementation of the unique two coil approach of the present invention. In fact, the disclosed motor control circuit contact arrangement need not be always employed if other fail-safe provisions are instead utilized.

Therefore, while this invention was described in connection with a particular example thereof, various modifications will become apparent to one skilled in the art. For example, although the invention has been described with reference to a three wheel industrial vehicle having two traction motors and a single dirigible wheel, it is equally applicable to four wheeled vehicles having two dirigible wheels as well as to track laying vehicles having no dirigible wheels. In addition, the invention may be applied to other dual motor devices. Similarly, the controller 24 may be replaced with equivalent hard wired circuitry including solenoid operated relays and other conventional logic circuitry. Other aspects, objects and advantages of this invention can be obtained from a study of the drawings, the disclosure and the appended claims.

I claim:

1. In an electrically operated dual motor drive system having first and second reversible traction motors (14,16) driven by a power source (18), the improvement comprising:

first motor control circuit means (10) having a first set of normally open contacts (32a,32b) connected in a series circuit from the power source (18) through the first motor (14) in a first direction, and having a second set of normally closed contacts (34a,34b) connected in a series circuit from the power source (18) through the first motor (14) in a second direction opposite said first direction;

second motor control circuit means (12) having a first set of normally closed contacts (40a,40b) connected in a series circuit from the power source (18) through the second motor (16) in said first direction, and having a second set of normally open contacts (38a,38b) connected in a series circuit from the power source (18) through the second motor (16) in said second direction;

a first coil (36) connected to complementally operate both sets of contacts (32a,32b,34a,34b) in the first motor control circuit (10);

a second coil (42) connected to complementally operate both sets of contacts (38a,38b,40a,40b) in the second motor control circuit (12);

controller means (24) for selectively energizing said first and second coils (36,42) to control actuation of the contacts in the first and second motor control circuit means (10,12) respectively, said system further comprising a line switch (20) coupled between the power source (18) and the first and second motors (14,16);

sensing means (74,76,78,86,87) for detecting preselected system conditions and delivering signals to said controller means (24) in response to said detected conditions; and said controller means (24) being adapted for receiving said signals and controllably operating said line switch (20) in response to said received signals.

2. A system as set forth in claim 1, wherein said sensing means (74, 76, 78, 86, 87) includes circuit means (86, 87) for delivering preselected signals to said control (24) in response to short circuit conditions associated with the motors (14, 16), said controller (24) being adapated to open said line switch (20) in response to receiving said preselected signals.

3. A system, as set forth in claim 2, including:
a third motor (60) coupled in series with said power source (18) and said line switch (20), and in parallel with said first and second motors (14, 16).

4. A system, as set forth in claim 1, including:
a direction selector device (78) having forward, reverse, and neutral positions;
said controller means (24) being adapted to energize said first coil (36) in response to said direction selector device (78) being in the forward position, to energize said second coil (42) in response to said selector device (78) being in the reverse position, and to de-energize both coils (36, 42) in response to said selector device being in a neutral position.

5. In an electrically operated vehicle having first and second traction motors (14, 16) connected to non-dirigible wheels (96, 98) and at least one dirigible wheel (100) for direction control, a drive control system comprising:
a battery (18);
a first motor control circuit (10) connected in parallel with the battery (18), said first motor control circuit (10) including first (32a, 32b) and second (34a, 34b) sets of contacts connected to the first motor (14); one of said first and second sets of contacts (34a, 34b) being normally closed and connected in a series current path from the battery (18) through the first motor (14), in a first direction, the other contact set (32a, 32b) being normally open and connected in a series current path through the first motor (14) in a second direction opposite the first direction;
a second motor control circuit (12) connected in parallel with the battery (18), said second motor control circuit including first (38a, 38b) and second (40a, 40b) sets of contacts connected to the second motor (16); one of said first and second sets of contacts (40a, 40b) being normally closed and connected in a series current path from the battery (18) through the second motor (16), in a first direction the other contact set (38a, 38b) being normally open and connected in a series current path through the second motor (16) in a second direction opposite the first direction;
a third motor (60) connected in parallel with said battery (18);
a line contactor (20) connected in series with the battery (18) and said motors (14, 16, 60);

a first coil (36) associated with said first motor control circuit (10); said first (32a, 32b) and second (34a, 34b) sets of contacts being complementally switched in response to said first coil (36) being energized;

a second coil (42) associated with said second motor control circuit (12); said first (38a, 38b) and second (40a, 40b) sets of contacts being complementally switched in response to said second coil being energized;

controller means (24) for energizing said line contactor (20), said first coil (36) and said second coil (42); and sensing means (74, 76, 78, 86, 87) for detecting preselected system conditions and delivering signals to said controller means (24) in response to said detected conditions.

6. A system, as set forth in claim 5, wherein sensing means (74, 76, 78, 86, 87) includes a key switch (74) and a seat switch (76) connected to said controller (24) and adapted to deliver preselected signals to said controller (24) in response to the status conditions of said switches (74, 76), said controller means (24) being adapted to control energization of said line contactor (20) in response to said preselected signals.

7. A system, as set forth in claim 4, wherein said sensing means (74, 76, 78, 86, 87) includes means (86, 87) for delivering signals to said controller means (24) indicating short circuit conditions associated with said first and second motors (14, 16), said controller means (24) being adapted to de-energize said line contactor (20) in response to said signals.

8. A system as set forth in claim 4, wherein said sensing means includes a direction selector device (78) having forward, neutral and reverse positions; said controller means (24) being adapted to energize said first coil (36) in response to said device (78) being in the forward position, to energize said second coil (42) in response to said device (78) being in the reverse position, and to de-energize both coils (36, 42) in response to the device (78) being in the neutral position.

9. The system of claim 8 wherein said first set of contacts in said first motor control circuit (10) are normally open contacts (32a, 32b) adapted to direct current from the battery (18) through said first motor (14) in a first direction, said second set of contacts being normally closed contacts (34a, 34b) adapted to direct current from said battery (18) through said first motor (14) in a second direction opposite from said first direction; and said first set of contacts in said second motor control circuit (12) being normally closed contacts (40a, 40b) adapted to direct current from said battery (18) through said second motor (16) in said first direction, said second set of contacts being normally open contacts (38a, 38b) adapted to direct current from said battery (18) through said second motor (16) in said second direction.

10. Apparatus for controlling the direction of movement of an electrically powered vehicle having first and second traction motors (14, 16) comprising:
a DC source (18);
first circuit means (10) for establishing oppositely directed complemental current paths from the source (18) to the first motor (14) and having an uncontrolled condition in which one of said current paths is completed and a controlled condition in which the other of said current paths is completed;

second circuit means (12) for establishing oppositely directed complemental current paths from the source (18) to the second traction motor (16) and having an uncontrolled condition in which one of the current paths is completed and a controlled condition in which the other of the current paths is completed; and control means (24) for selectively producing the controlled current path conditions.

11. Apparatus as defined in claim 10 wherein the uncontrolled condition of the first circuit means produces a first direction of first traction motor rotation, the uncontrolled condition of the second circuit means produces a second direction of second traction motor rotation, said first and second directions of rotation being of opposite effect on the propulsion of said vehicle.

12. Apparatus as defined in claim 10 further including a switch (20) connected between the source (18) and both of said first (10) and second (12) circuit means.

* * * * *